United States Patent
Adams et al.

(10) Patent No.: US 12,485,982 B1
(45) Date of Patent: Dec. 2, 2025

(54) SIDE RAIL FOR TRAILER

(71) Applicant: Dorsey Trailer LLC, Elba, AL (US)

(72) Inventors: James H. Adams, Tega Cay, SC (US); CJ Watson, New Brockton, AL (US)

(73) Assignee: Dorsey Trailer LLC, Elba, AL (US)

( * ) Notice: Subject to any disclaimer, the term of this patent is extended or adjusted under 35 U.S.C. 154(b) by 0 days.

(21) Appl. No.: 19/032,838

(22) Filed: Jan. 21, 2025

Related U.S. Application Data

(60) Provisional application No. 63/719,303, filed on Nov. 12, 2024.

(51) Int. Cl.
| | |
|---|---|
| *B62D 63/08* | (2006.01) |
| *B62D 21/20* | (2006.01) |
| *B62D 33/02* | (2006.01) |
| *B62D 53/06* | (2006.01) |

(52) U.S. Cl.
CPC ............ *B62D 63/08* (2013.01); *B62D 21/20* (2013.01); *B62D 33/02* (2013.01); *B62D 53/06* (2013.01)

(58) Field of Classification Search
CPC .... B62D 21/20; B62D 25/2054; B62D 33/02; B62D 53/06; B62D 53/061; B62D 53/067; B62D 63/06; B62D 63/068; B62D 63/08; B60R 19/42
USPC ........................................... 296/182.1, 184.1
See application file for complete search history.

(56) References Cited

U.S. PATENT DOCUMENTS

| | | | |
|---|---|---|---|
| 7,568,754 B2 | 8/2009 | Adams | |
| 7,896,427 B2 | 3/2011 | Adams | |
| 8,439,427 B2 | 5/2013 | Adams | |
| 11,459,045 B1 | 10/2022 | Hensiek | |
| 11,702,164 B2 | 7/2023 | Homec et al. | |
| 11,932,335 B2 | 3/2024 | Homec et al. | |
| 2007/0007759 A1 | 1/2007 | Lemmons | |
| 2008/0164723 A1* | 7/2008 | Adams | B60P 7/0815 296/184.1 |
| 2011/0042637 A1* | 2/2011 | Howard | E04H 17/1439 256/65.01 |
| 2011/0283924 A1* | 11/2011 | Adams | B65D 90/006 108/57.22 |
| 2013/0036960 A1* | 2/2013 | Berman | B63B 59/02 114/219 |
| 2014/0086699 A1* | 3/2014 | Adams | B60P 7/0823 410/106 |
| 2017/0008581 A1* | 1/2017 | Booher | B62D 21/20 |
| 2020/0199838 A1* | 6/2020 | DeMay | E02B 3/26 |
| 2023/0009915 A1* | 1/2023 | Homec | B62D 63/08 |
| 2023/0331324 A1* | 10/2023 | Homec | B60P 7/0815 |

* cited by examiner

*Primary Examiner* — Gregory A Blankenship
(74) *Attorney, Agent, or Firm* — HAYNES AND BOONE, LLP

(57) ABSTRACT

A side rail for a trailer including a side rail body and a rub rail body configured to be operably coupled to the side rail body. In one or more embodiments, the side rail body includes a pair of connecting walls extending transversely from a side rail wall of the side rail body and configured to be received within a corresponding pair of grooves of the rub rail body so as to operably couple the rub rail body to the side rail body in spaced relation.

19 Claims, 12 Drawing Sheets

SIDE RAIL FOR TRAILER

CROSS-REFERENCE TO RELATED APPLICATION

This application claims the benefit of the filing date of, and priority to, U.S. Patent Application No. 63/719,303 (the "'303 Application"), filed Nov. 12, 2024, the entire disclosure of which is hereby incorporated herein by reference.

TECHNICAL FIELD

The present disclosure relates, in general, to trailers, and more particularly, to a side rail for a trailer and associated methods, apparatus, and/or systems.

BACKGROUND

Trailers (e.g., flatbed trailers) are designed to transport loads having many different sizes and configurations. A typical trailer includes two main beams which extend from the front to the rear of the trailer. Cross members spaced apart at regular intervals are attached transversely to the two main beams and a floor is laid on top of the cross members. The floor is exposed to significant wear and tear while transporting cargo. To mitigate stresses on the floor, side rails are attached to the outside edges of the cross members to provide stability. Some side rails utilize rub rails to protect the trailer against side impacts. To safely transport a load, the load should be secured against movement relative to the trailer. Openings in or between the side rail and the rub rail are often used to facilitate attachment and utilization of load securing systems, which retain the load against movement relative to the trailer. Such load securing systems may include winches, ropes, straps, chains, stakes, posts, and/or other similar restraint devices.

DETAILED DESCRIPTION

The following disclosure provides many different embodiments. Specific examples of components and arrangements are described below to simplify the present disclosure. These are, of course, merely examples and are not intended to be limiting. In addition, the present disclosure may repeat reference terms in the various embodiments. This repetition is for the purpose of simplicity and clarity and does not in itself dictate a relationship between the various embodiments and/or configurations discussed.

Figure 1:
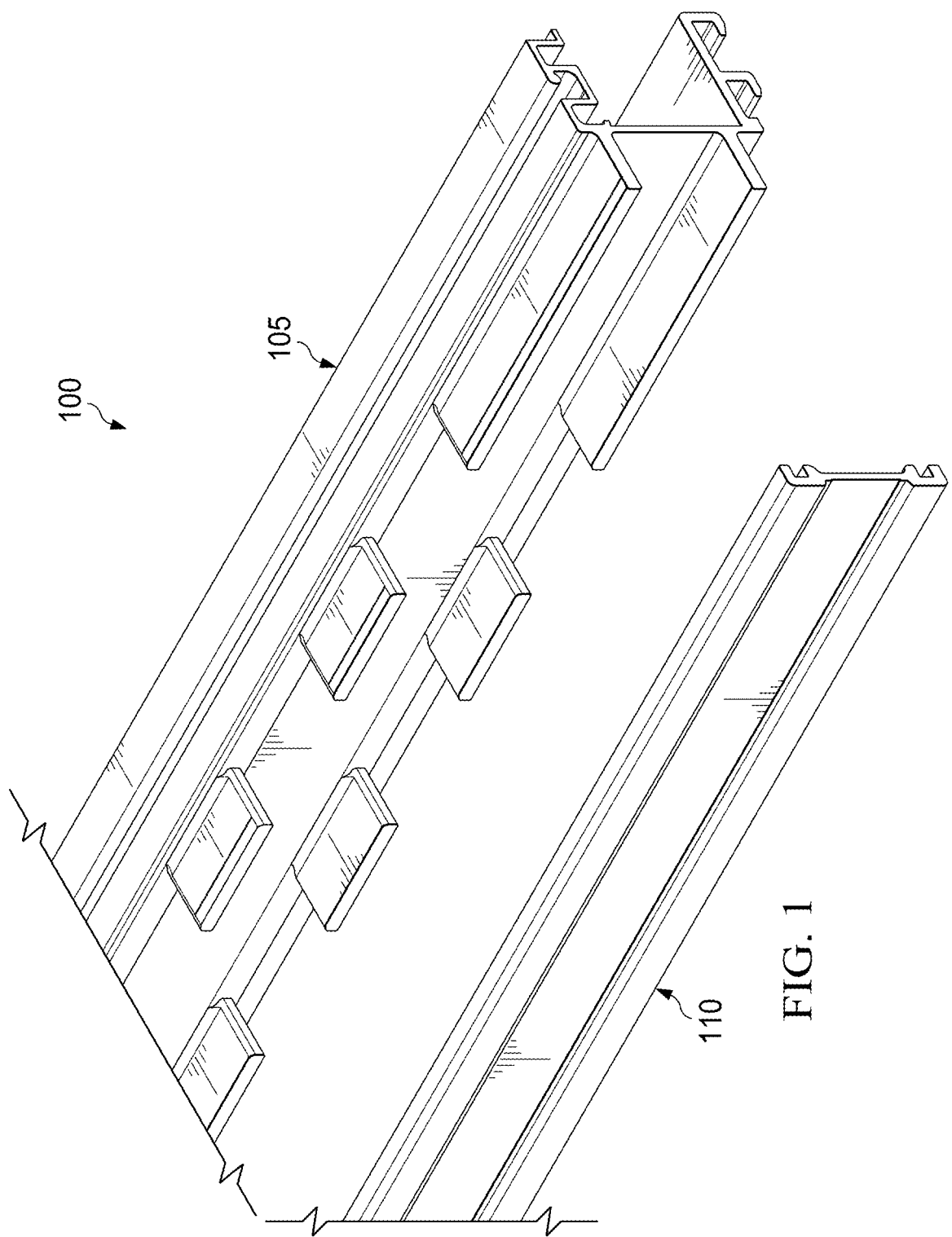
FIG. 1 illustrates an exploded view of a portion of a side rail for a trailer, the side rail including a side (or "inner") rail body and a rub (or "outer") rail body, according to one or more embodiments.
Figure 2:
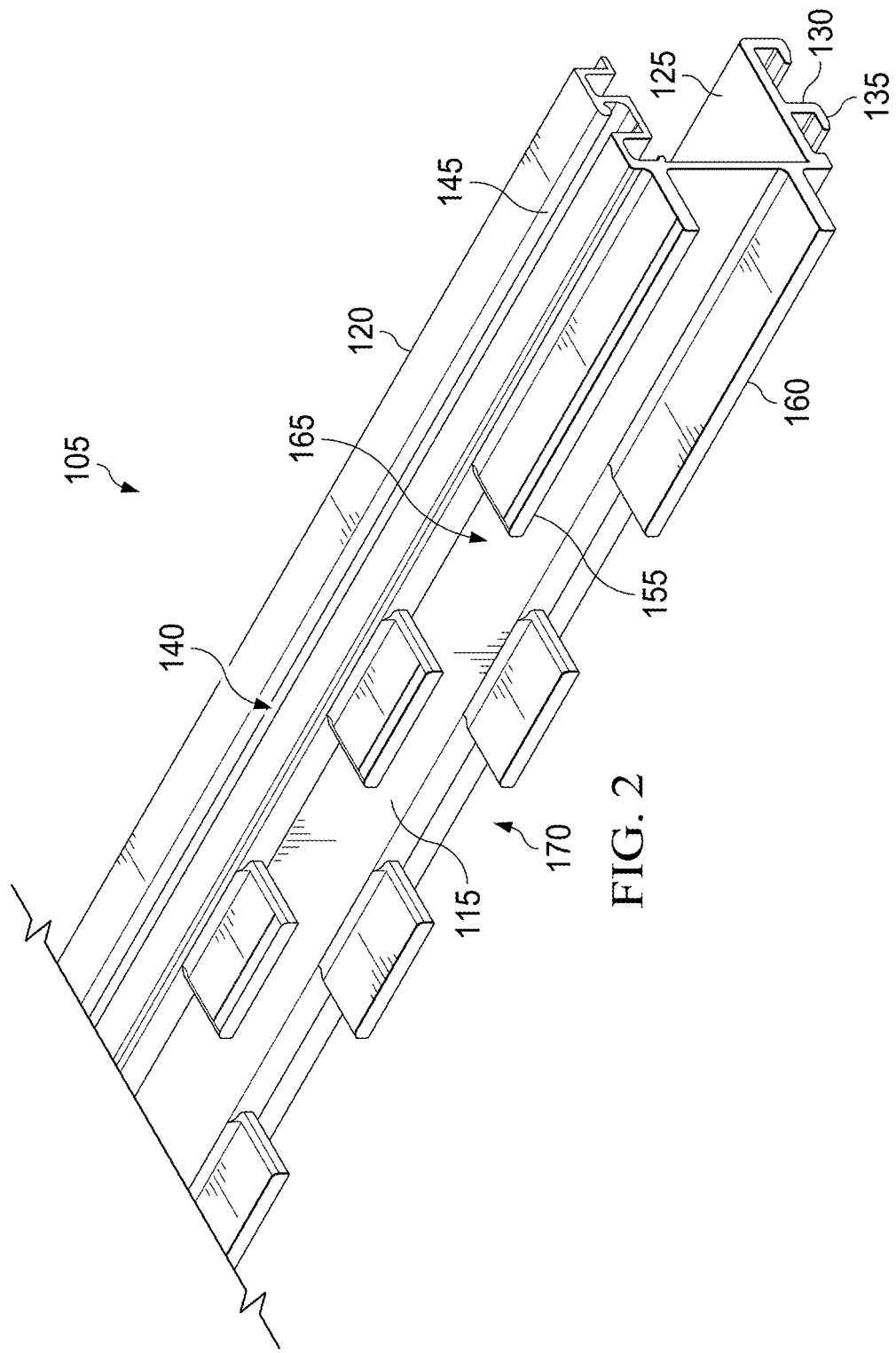
FIG. 2 illustrates a perspective view of the side rail body of FIG. 1, the side rail body including upper and lower connecting walls, according to one or more embodiments.

FIG. 1 illustrates a portion of a side rail 100 for a trailer, such as a flatbed trailer, according to one or more embodiments of the present disclosure. In one or more embodiments, the side rail 100 is a two-piece system including a side (or "inner") rail body 105 and a rub (or "outer") rail body 110. In one or more embodiments, the side rail body 105 is a one-piece extruded body. In one or more embodiments, the side rail body 105 is made of a metal, such as, for example, aluminum. In addition, or instead, in one or more embodiments, the rub rail body 110 is a one-piece extruded body. In one or more embodiments, the rub rail body 110 is made of a metal, such as, for example, aluminum. In one or more embodiments, the side rail body 105 and the rub rail body 110 are formed and/or shaped via cutting, roll-forming, press-forming, computer numerical control (CNC) machining, or a combination thereof.

FIGS. 2 through 5 further illustrate the side rail body 105 of the side rail 100. As shown, the side rail body 105 has a substantially C-channel shape, having an elongated side rail wall 115 defining opposing upper and lower portions, an upper rail wall 120, and a lower rail wall 125. In one or more embodiments, the upper rail wall 120 and the lower rail wall 125 are spaced apart, extending transversely in the same direction from the opposing upper and lower portions of the side rail wall 115.

In one or more embodiments, a web 130 extends transversely from the lower rail wall 125 in a direction away from the upper rail wall 120. In one or more embodiments, the web 130 includes a lower flange 135 extending transversely at a distal end portion thereof in a direction toward the side rail wall 115. Alternatively, the lower flange 135 may extend in a direction away from the side rail wall 115. In one or more embodiments, the web 130 extends along only a portion of a longitudinal length of the lower rail wall 125. In one or more embodiments, the web 130 extends along the entire longitudinal length of the lower rail wall 125. In one or more embodiments, the web 130 includes a plurality of web segments spaced along the longitudinal length of the lower rail wall 125. In one or more embodiments, the web 130 facilitates attachment of load securing devices and assemblies to the side rail 100. In one or more embodiments, multiple webs 130 are spaced along the lower rail wall 125—for example, FIG. 3 illustrates a pair of webs 130 spaced along the lower rail wall 125.

In one or more embodiments, the upper rail wall 120 includes an upper channel 140 and an upper flange 145 extending into the upper channel 140. In one or more embodiments, the upper flange 145 extends partway across the upper channel 140. In one or more embodiments, the upper channel 140 opens externally relative to the overall C-channel shape of the side rail body 105. The upper channel 140 and the upper flange 145 facilitate attachment of load securing devices and assemblies to the side rail 100. In one or more embodiments, the upper rail wall 120 also defines lower channels 147 on either side of the upper channel 140, which lower channels 147 open internally relative to the overall C-channel shape of the side rail body 105.

In one or more embodiments, the upper rail wall 120 also includes a stepped lip 148 extending below an upper surface 149 of the upper rail wall 120. The stepped lip 148 is vertically spaced from the upper surface 149 of the upper rail wall 120 by a distance corresponding with a height of a floorboard (not shown) adjoining the side rail body 105 along the stepped lip 148. In one or more embodiments, a plurality of floorboards adjoin a pair of parallel-extending and spaced-apart side rail bodies 105 by extending between the side rail bodies 105 and along their respective stepped lips 148. In one or more embodiments, when the floorboards so extend along the respective stepped lips 148 of the side rail bodies 105, an upper surface of the floorboards is substantially flush with the upper surface 149 of the upper rail wall 120 of the side rail body 105.

Figure 3:
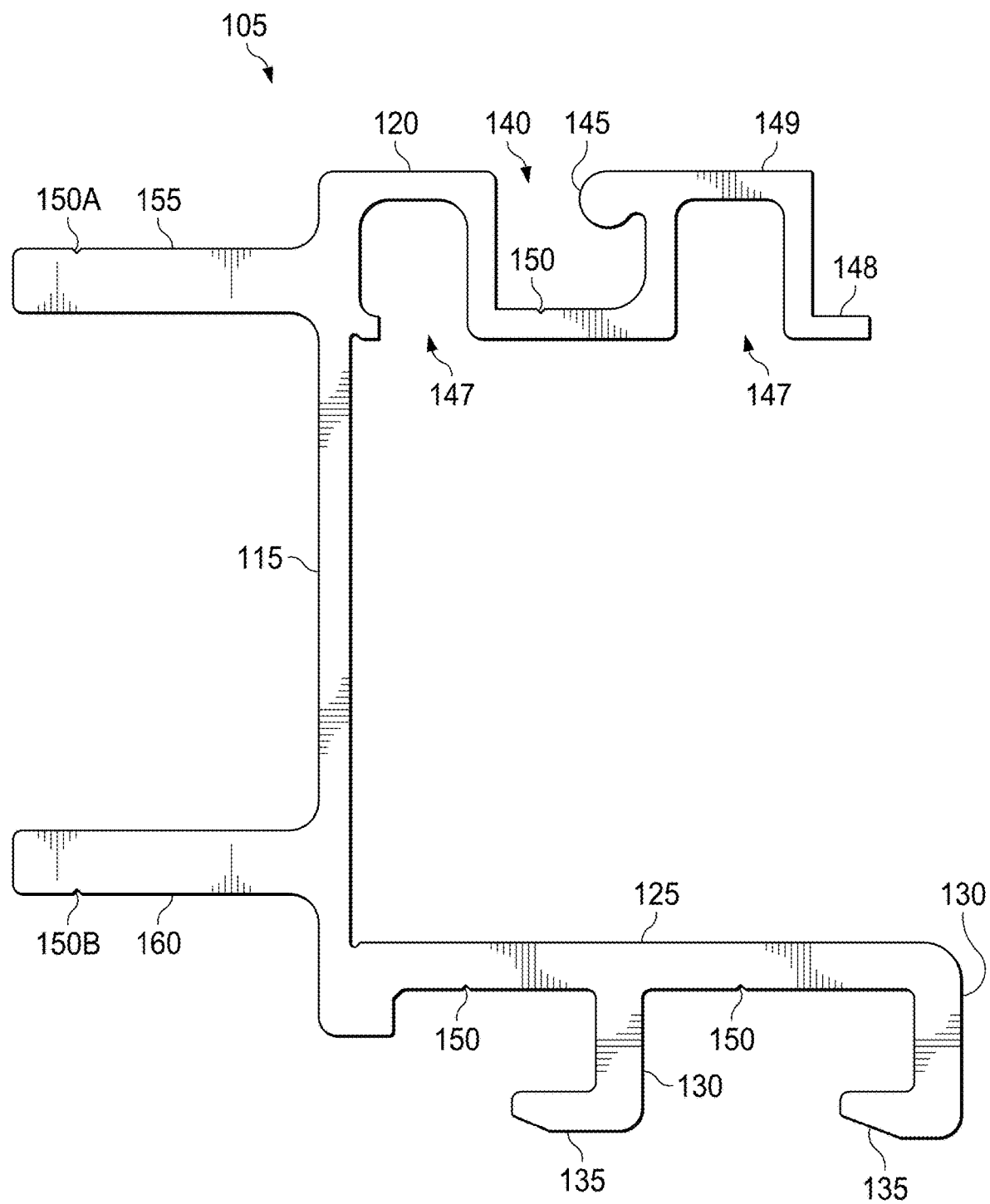
FIG. 3 illustrates an end view of the side rail body of FIG. 2, according to one or more embodiments.
Figure 4:
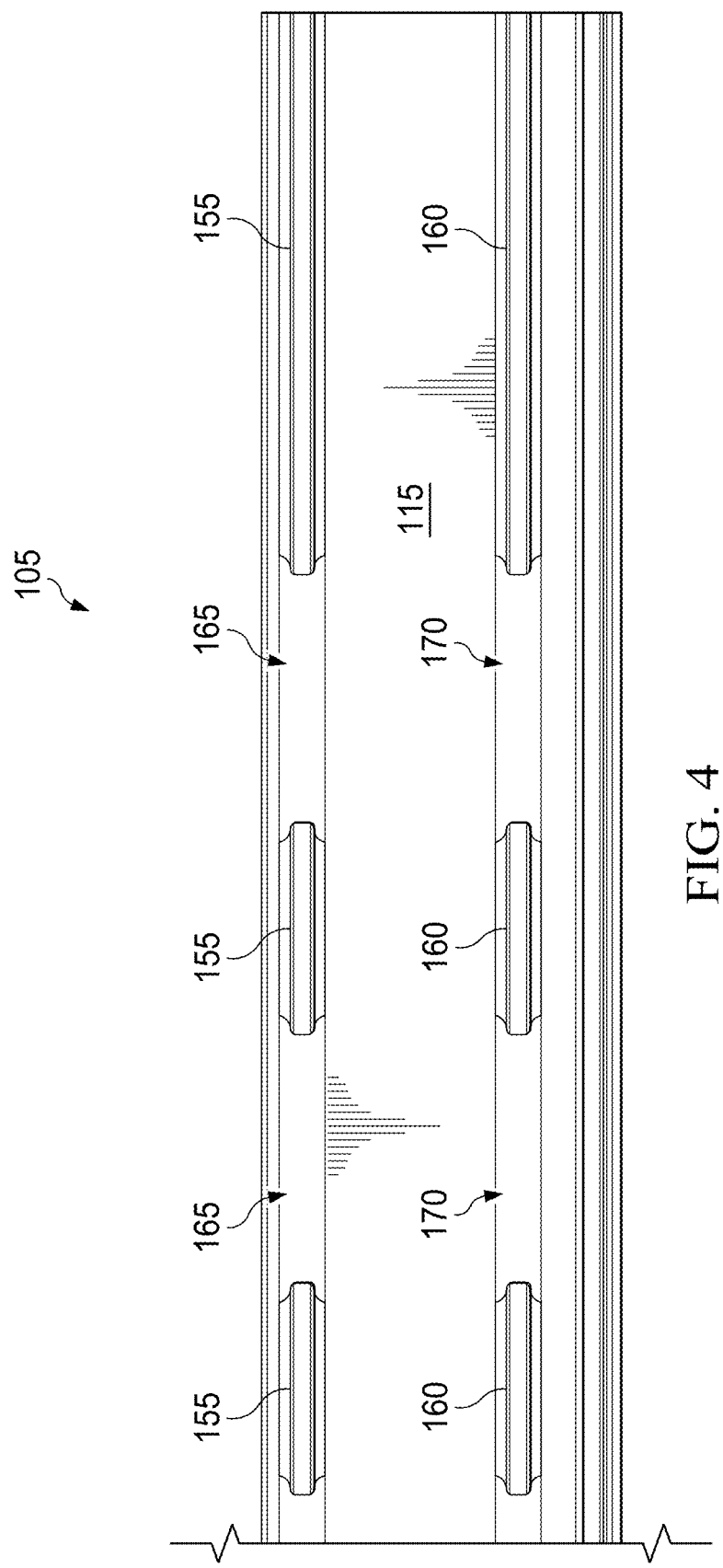
FIG. 4 illustrates an elevational view of the side rail body of FIG. 2, according to one or more embodiments.

As shown in FIG. 3, in one or more embodiments, the side rail body 105 also includes a plurality of notches 150. In one or more embodiments, the plurality of notches 150 facilitates attachment of structural members, floor panels, and/or the rub rail body 110 to the side rail body 105. In one or more embodiments, the plurality of notches 150 is configured to receive fasteners or welds to attach said structural members, floor panels, and/or the rub rail body 110 to the side rail body 105.

With continued reference to FIGS. 2 through 5, the side rail body 105 further includes an upper connecting wall 155 and a lower connecting wall 160 extending in the same direction transversely from opposing upper and lower portions of the side rail wall 115. In one or more embodiments, the upper and lower connecting walls 155, 160 are inset from opposing upper and lower edges of the side rail wall 115. In one or more embodiments, the upper connecting wall 155 and the lower connecting wall 160 extend from the side rail wall 115 in a direction opposite the direction in which the upper rail wall 120 and the lower rail wall 125 extend from the side rail wall 115. In one or more embodiments, as in FIGS. 2 through 5, the lower connecting wall 160 extends transversely from the side rail wall 115 at a position between the upper rail wall 120 and the lower rail wall 125, so as to be inset relative to the lower rail wall 125. Additionally, or alternatively, although not shown, the upper connecting wall 155 extends transversely from the side rail wall 115 at a position between the upper rail wall 120 and the lower rail wall 125, so as to be inset relative to the upper rail wall 120. In one or more embodiments, as in FIGS. 2 through 5, the upper connecting wall 155 is at least partially vertically aligned with the upper rail wall 120 along the side rail wall 115 such that the upper connecting wall 155 and the upper rail wall 120 are at least partially positioned along a shared height segment of the side rail wall 115. Additionally, or alternatively, although not shown, the lower connecting wall 160 may be at least partially vertically aligned with the lower rail wall 125 along the side rail wall 115 such that the lower connecting wall 160 and the lower rail wall 125 are at least partially positioned along a shared height segment of the side rail wall 115.

In one or more embodiments, the upper and lower connecting walls 155, 160 extend from the side rail wall 115 at an angle of less than, greater than, or equal to, 90 degrees. In one or more embodiments, the upper and lower connecting walls 155, 160 have flanges or chamfers to facilitate connection with the rub rail body 110 and/or to improve structural rigidity. In one or more embodiments, the upper and lower connecting walls 155, 160 include notches 150A and 150B, respectively, which are configured to receive fasteners or welds to facilitate attachment of the respective upper and lower connecting walls 155, 160 with the rub rail body 110, as will be described in further detail below.

In one or more embodiments, the upper connecting wall 155 is segmented along the longitudinal length of the side rail wall 115 proximate the upper portion of the side rail wall 115. In one or more embodiments, each segment of the upper connecting wall 155 extends transversely from the side rail wall 115 by the same distance and at the same height, such that each segment of the upper connecting wall 155 extends within the same plane. The segments of the upper connecting wall 155 are interspersed with, and spaced apart by, a plurality of upper gaps 165. In one or more embodiments, a longitudinal length of each segment of the upper connecting wall 155 is equal. Additionally, or alternatively, a longitudinal length of each gap of the plurality of upper gaps 165 may be equal. In one or more embodiments, as in FIGS. 2 through 5, the segments of the upper connecting wall 155 positioned at either longitudinal end portion of the side rail body 105 have a longer length than the remaining segments of the upper connecting wall 155. Additionally, or alternatively, the lengths of each segment of the upper connecting wall 155 may vary.

In one or more embodiments, the lower connecting wall 160 is segmented along the longitudinal length of the side rail wall 115 proximate the lower portion of the side rail wall 115. In one or more embodiments, each segment of the lower connecting wall 160 extends transversely from the side rail wall 115 by the same distance and at the same height, such that each segment of the lower connecting wall 160 extends within the same plane. The segments of the lower connecting wall 160 are interspersed with, and spaced apart by, a plurality of lower gaps 170. In one or more embodiments, a longitudinal length of each segment of the lower connecting wall 160 is equal. Additionally, or alternatively, a longitudinal length of each gap of the plurality of lower gaps 170 may be equal. In one or more embodiments, as in FIGS. 2 through 5, the segments of the lower connecting wall 160 positioned at either longitudinal end portion of the side rail body 105 have a longer length than the remaining segments of the lower connecting wall 160. Additionally, or alternatively, the lengths of each segment of the lower connecting wall 160 may vary.

In one or more embodiments, each segment of the upper connecting wall 155 corresponds to a respective segment of the lower connecting wall 160. In one or more embodiments, the longitudinal length of each segment of the upper connecting wall 155 is equal to the longitudinal length of the corresponding segment of the lower connecting wall 160. In one or more embodiments, each segment of the upper connecting wall 155 is longitudinally aligned with the corresponding segment of the lower connecting wall 160 along the longitudinal length of the side rail body 105.

In one or more embodiments, each gap of the plurality of upper gaps 165 corresponds to a respective gap of the plurality of lower gaps 170. In one or more embodiments, the longitudinal length of each gap of the plurality of upper gaps 165 is equal to the longitudinal length of the corresponding gap of the plurality of lower gaps 170. In one or more embodiments, each gap of the plurality of upper gaps 165 is longitudinally aligned with the corresponding gap of the plurality of lower gaps 170 along the longitudinal length of the side rail body 105.

Figure 5:
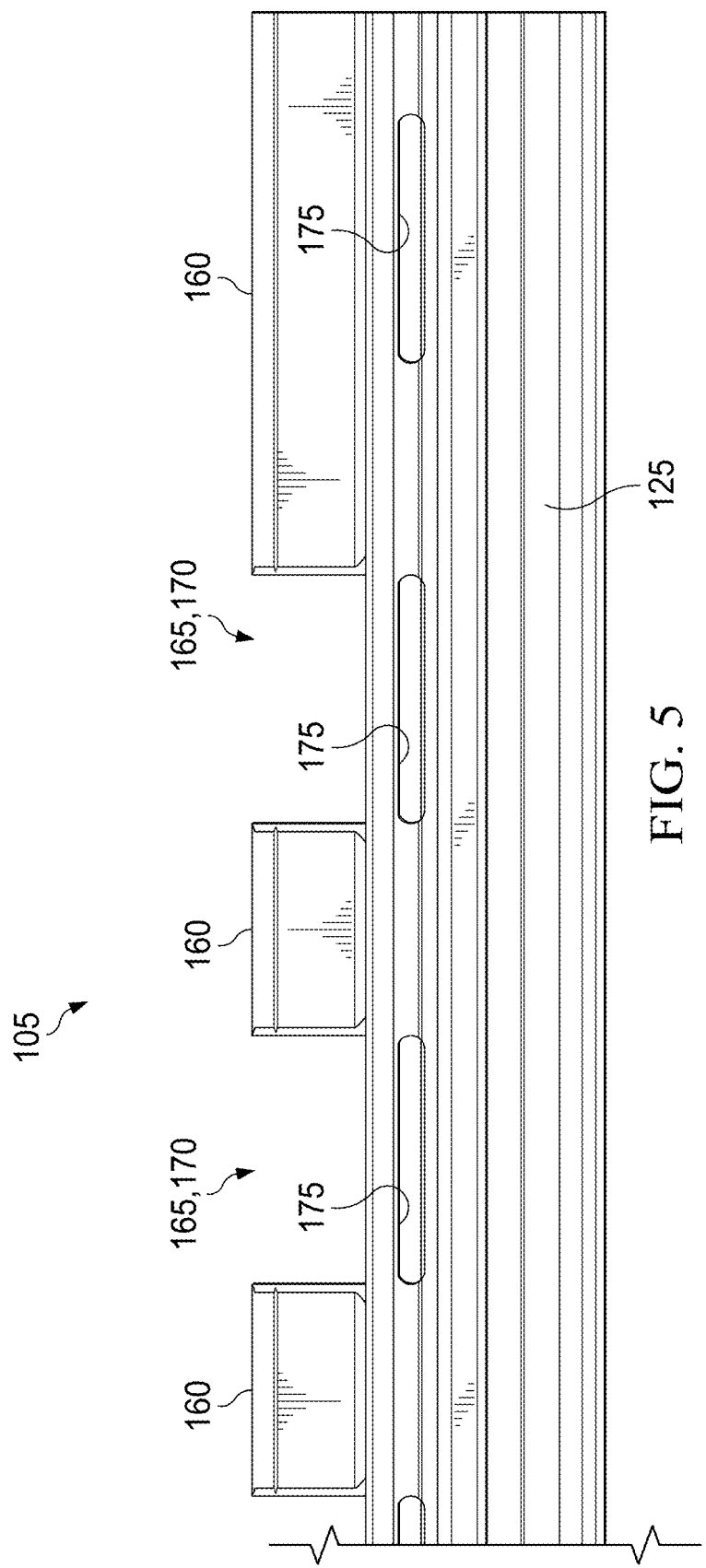
FIG. 5 illustrates a bottom view of the side rail body of FIG. 2, according to one or more embodiments.

As shown in FIG. 5, in one or more embodiments, the lower rail wall 125 includes a plurality of openings 175 to facilitate attachment of load securing devices and assemblies to the side rail 100, as will be described in further detail below. In one or more embodiments, each of the plurality of openings 175 is longitudinally aligned with a corresponding pair of the upper and lower gaps 165, 170. In one or more embodiments, the plurality of openings 175 extend through the lower rail wall 125 proximate the side rail wall 115. In one or more embodiments, the longitudinal length of each of the plurality of openings 175 is equal to the respective longitudinal lengths of the corresponding pair of the upper and lower gaps 165, 170.

Figure 6:
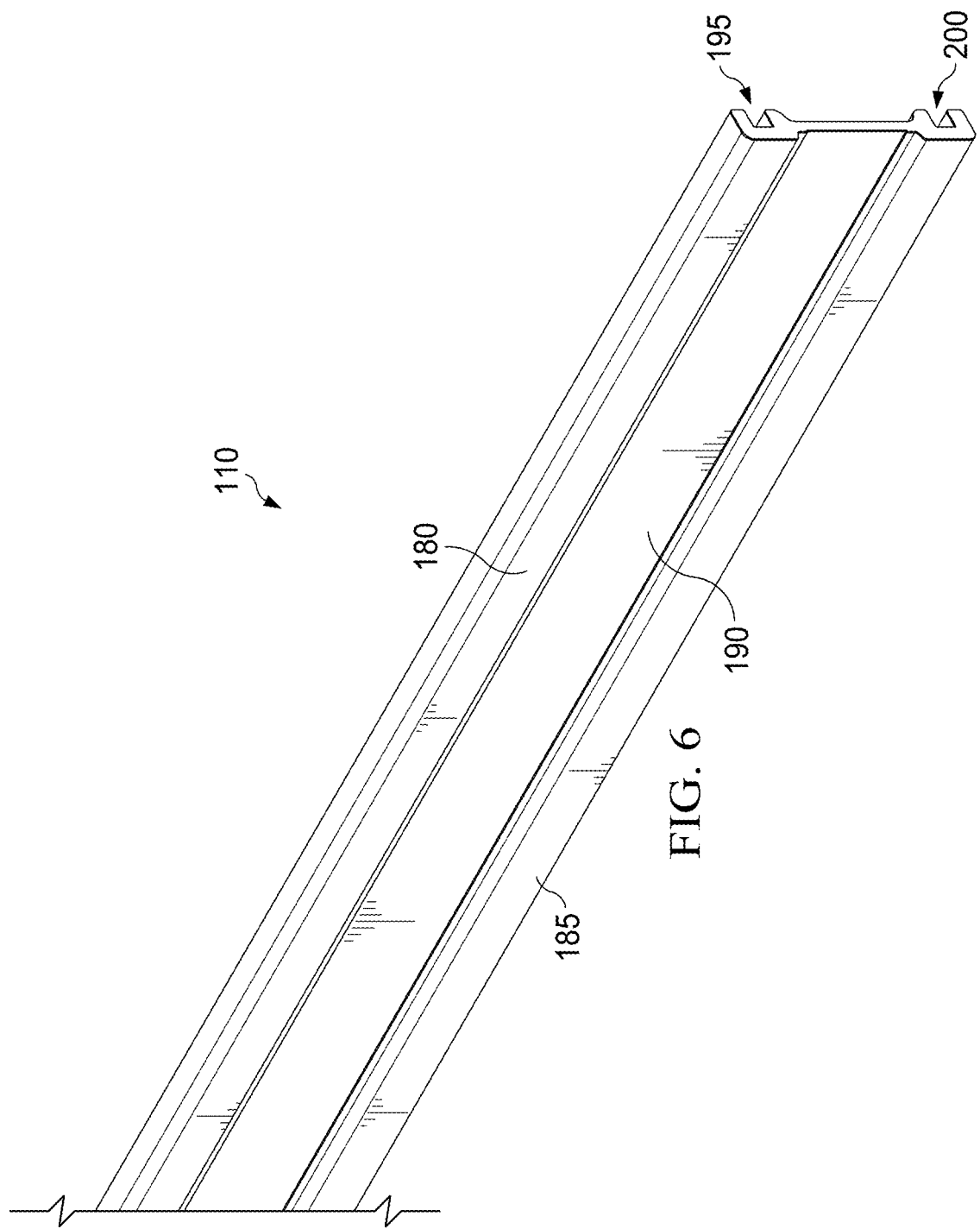
FIG. 6 illustrates a perspective view of the rub rail body of FIG. 1, according to one or more embodiments.
Figure 7:
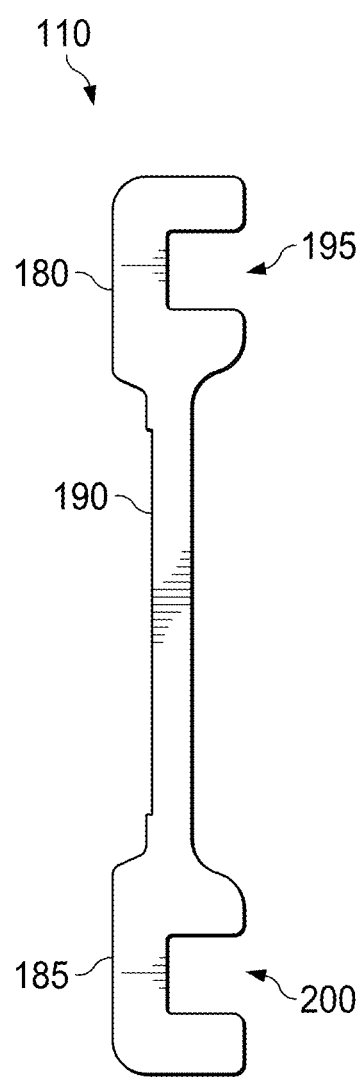
FIG. 7 illustrates an end view of the rub rail body of FIG. 6, according to one or more embodiments.

FIGS. 6 and 7 further illustrate the rub rail body 110 of the side rail 100. In one or more embodiments, the rub rail body 110 is or includes an elongated rub rail wall defining an upper portion 180 and an opposing lower portion 185. In one or more embodiments, a middle portion 190 of the rub rail body 110 extends vertically between the upper portion 180 and the lower portion 185, and is thinner than, and/or inset relative to, the upper and lower portions 180, 185.

In one or more embodiments, the rub rail body 110 further includes an upper groove 195 formed into, and/or disposed proximate, the upper portion 180, and a lower groove 200 formed into, and/or disposed proximate, the lower portion 185. In one or more embodiments, the upper groove 195 of the rub rail body 110 is configured to receive a portion of the upper connecting wall 155 of the side rail body 105, and the lower groove 200 of the rub rail body 110 is configured to receive a portion of the lower connecting wall 160 of the side rail body 105, to facilitate attachment of the rub rail body 110 and the side rail body 105. In one or more embodiments, the upper groove 195 and the lower groove 200 extend along the entire longitudinal length of the rub rail body 110. Alternatively, the upper groove 195 may be segmented along the longitudinal length of the rub rail body 110, such that each segment of the upper groove 195 is positioned to correspond to a respective segment of the upper connecting wall 155. Likewise, the lower groove 200 may be segmented along the longitudinal length of the rub rail body 110, such that each segment of the lower groove 200 is positioned to correspond to a respective segment of the lower connecting wall 160.

Figure 8A:
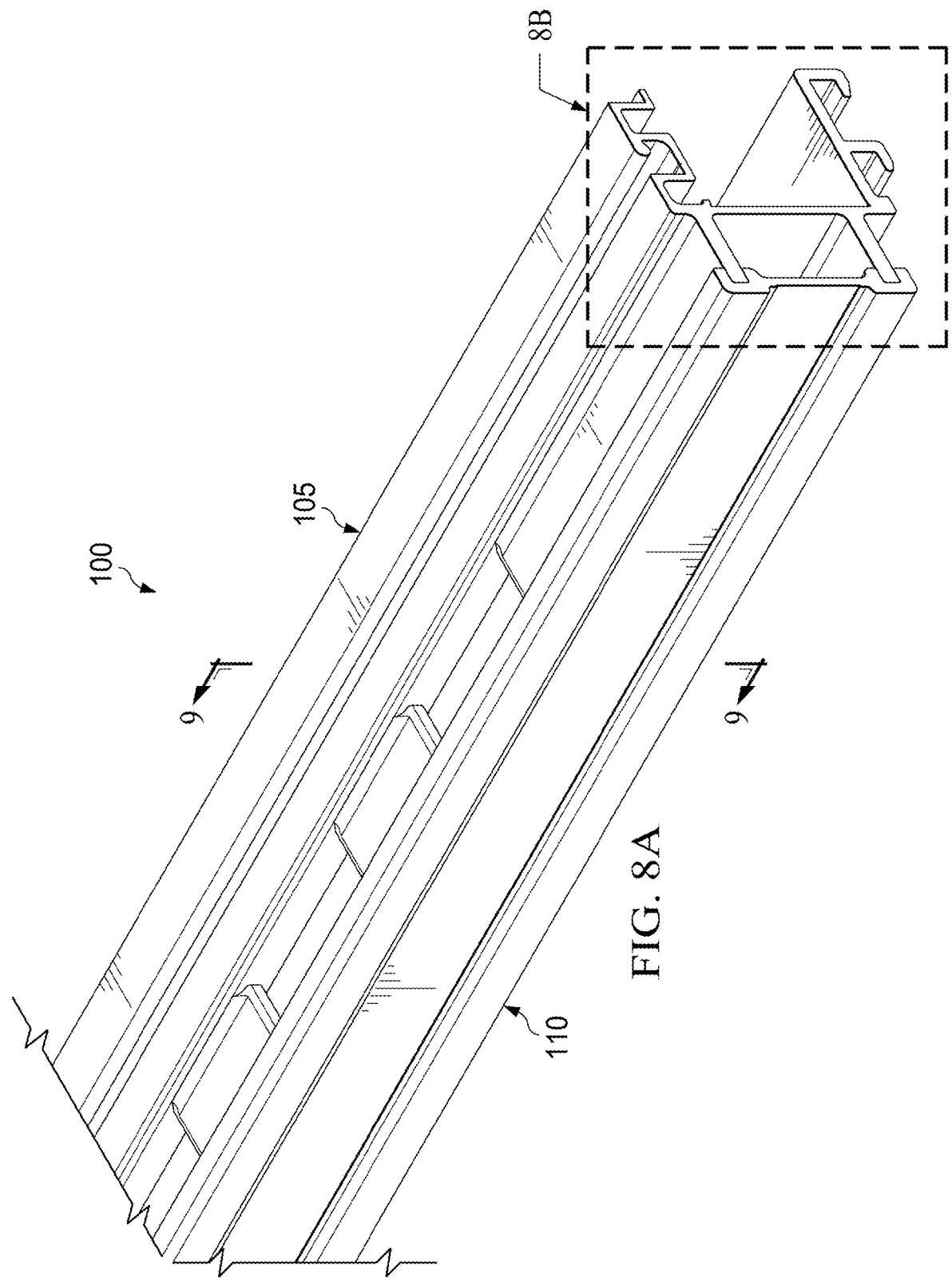
FIG. 8A illustrates a perspective view of the side rail of FIG. 1 in an assembled state or configuration, according to one or more embodiments.
Figure 8B:
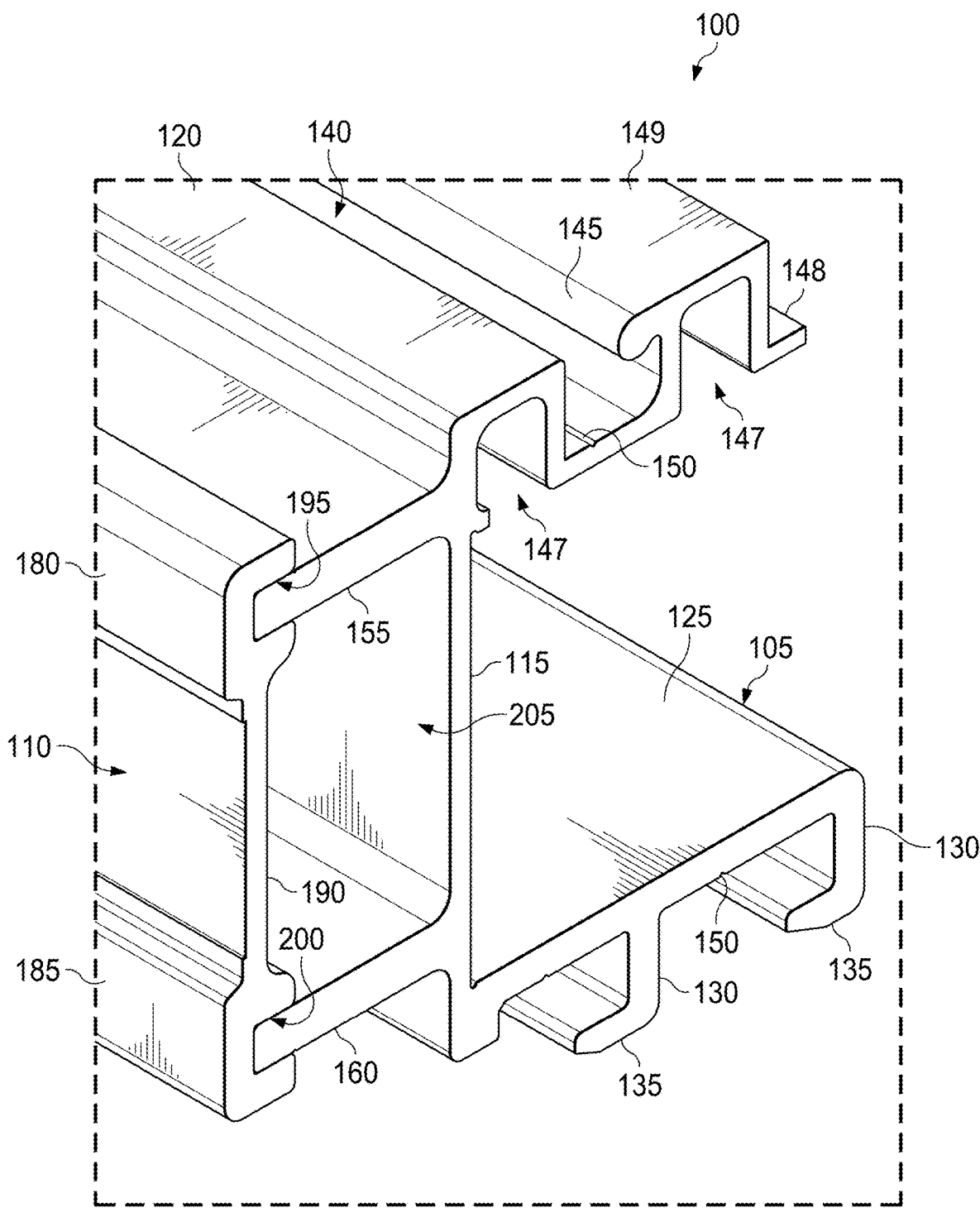
FIG. 8B illustrates an enlarged perspective view of a portion of the side rail of FIG. 8A, according to one or more embodiments.
Figure 9:
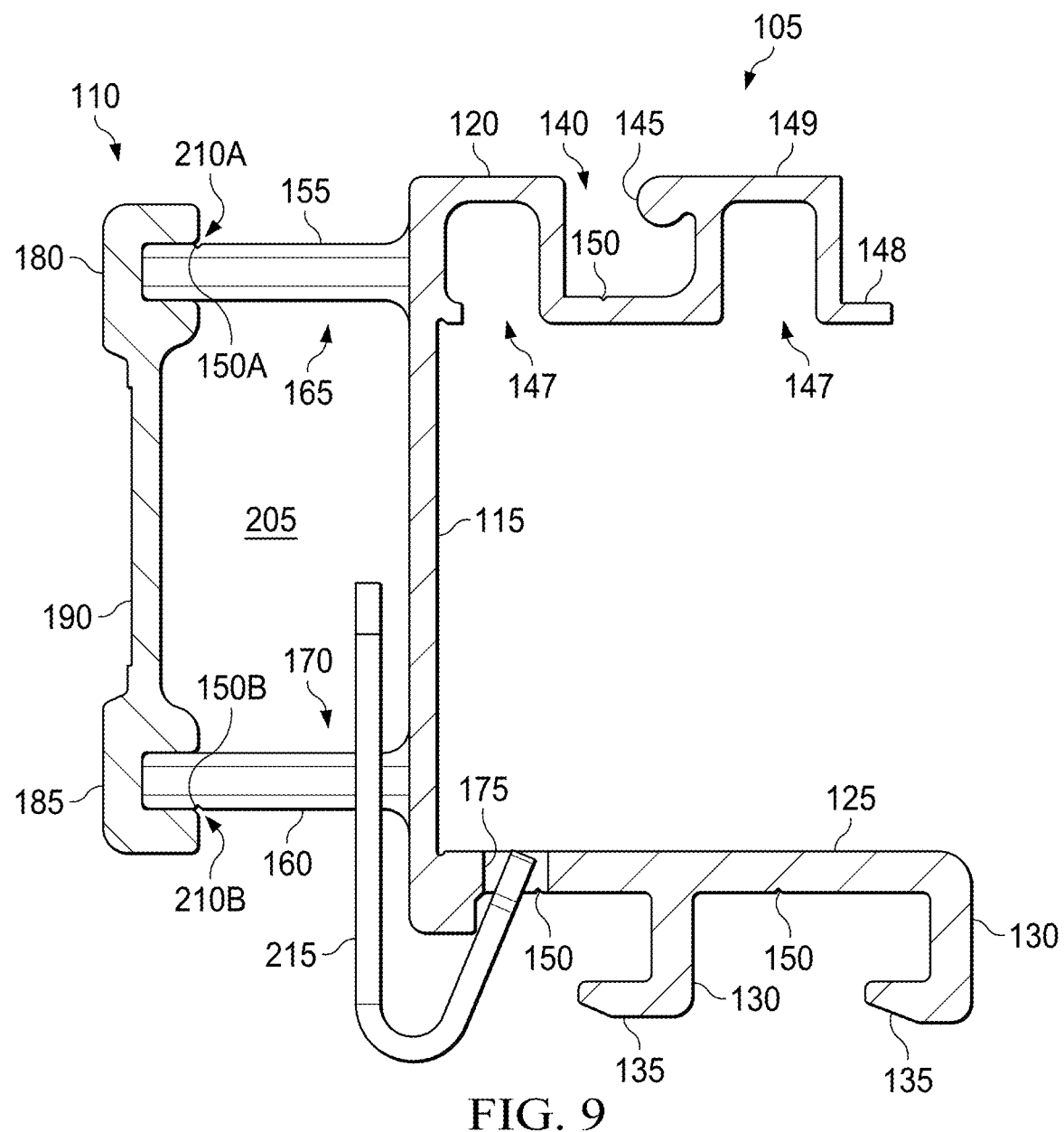
FIG. 9 illustrates a cross-sectional view of the side rail of FIG. 8A taken along the line 9-9 of FIG. 8A, together with a load securing device, according to one or more embodiments.

FIGS. 8A through 9 illustrate the side rail body 105 and the rub rail body 110 of the side rail 100 in an assembled state or configuration. The rub rail body 110 is assembled onto the side rail body 105 by receiving a portion of the upper connecting wall 155 of the side rail body 105 into the upper groove 195 of the rub rail body 110, and receiving a portion of the lower connecting wall 160 of the side rail body 105 into the lower groove 200 of the rub rail body 110. In one or more embodiments, when in the assembled state or configuration, the rub rail body 110 is spaced apart from the side rail wall 115 of the side rail body 105 by the upper and lower connecting walls 155, 160, such that a longitudinal passage 205 is defined between, and extends along, the rub rail wall of the rub rail body 110 and the side rail wall 115 of the side rail body 105. In one more embodiments, the longitudinal passage 205 is at least partially bounded by the rub rail wall of the rub rail body 110, the side rail wall 115 of the side rail body 105, the upper connecting wall 155 of the side rail body 105, and the lower connecting wall 160 of the side rail body 105. In one or more embodiments, the longitudinal passage 205 facilitates attachment and use of load securing devices and systems.

In one or more embodiments, to secure the attachment of the rub rail body 110 to the side rail body 105, rub rail body 110 is welded to the side rail body 105. In one or more embodiments, the rub rail body 110 is welded to the side rail body 105 at any one or more points of intersection or interface between the rub rail body 110 and the side rail body 105. Referring to FIG. 9, the rub rail body 110 and the side rail body 105 are welded together at weld points 210A, 210B. In one or more embodiments, the weld points 210A, 210B correspond to the notches 150A, 150B, respectively, which facilitate welding of the rub rail body 110 to the side rail body 105.

As further shown in FIG. 9, a hook 215 may be removably attached to the side rail 100 to facilitate load securement. In one or more embodiments, one end of the hook 215 extends through one of the openings 175 in the lower rail wall 125 of the side rail body 105. An opposing end of the hook 215 extends up into the longitudinal passage 205 through the corresponding gap of the plurality of lower gaps 170 (i.e., between the rub rail body 110 and the side rail wall 115 of the side rail body 105). In one or more embodiments, a strap or rope (not shown) is attached to the opposing end of the hook 215 and extends through the corresponding gap of the plurality of upper gaps 165 to facilitate load securement. In one or more embodiments, a plurality of hooks, similar to the hook 215, and/or other load securing devices, are attached along the side rail 100 to secure loads.

Figure 10:
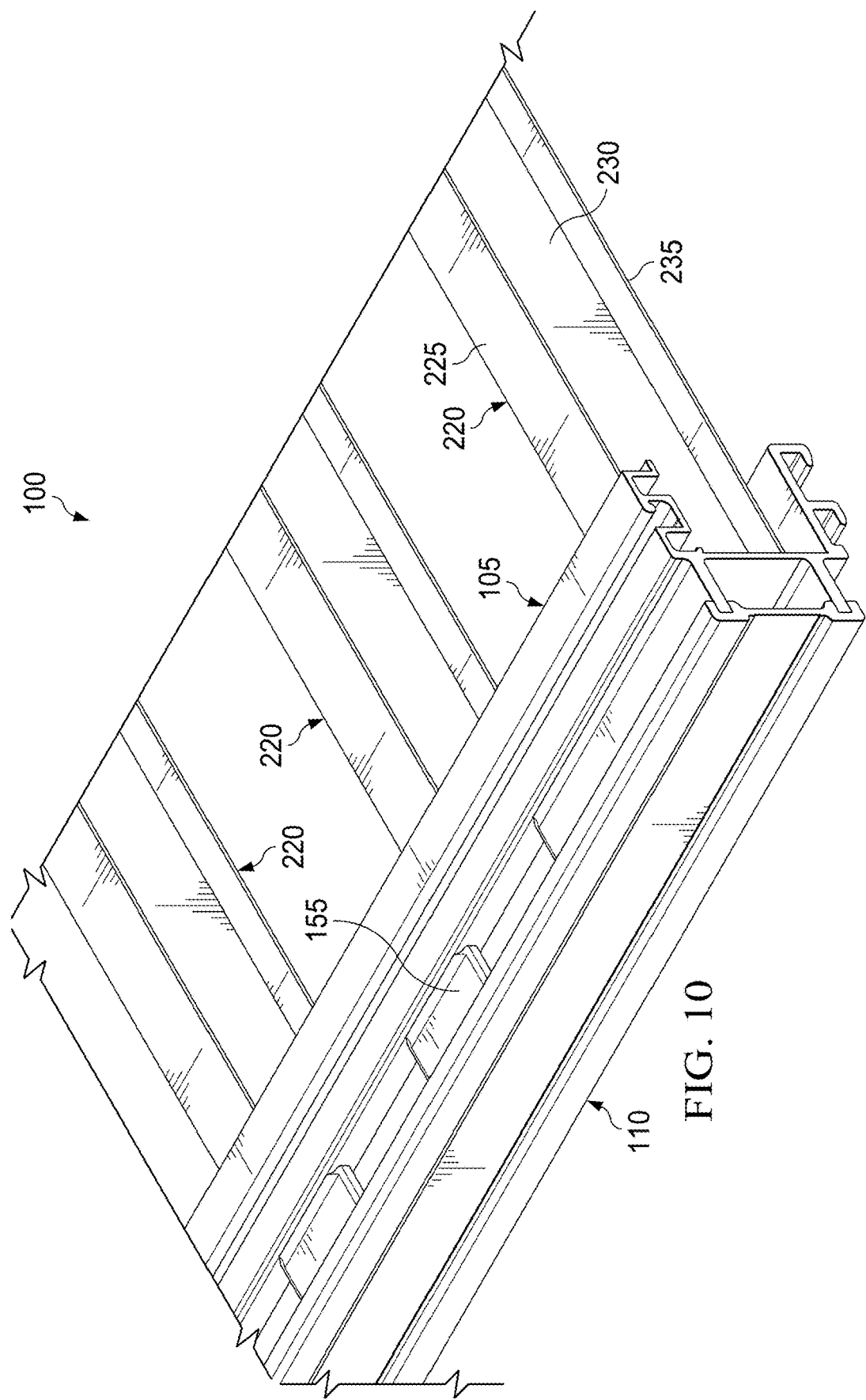
FIG. 10 illustrates a perspective view of the side rail of FIG. 8A connected to a plurality of structural members (e.g., cross members) of the trailer, according to one or more embodiments.
Figure 11:
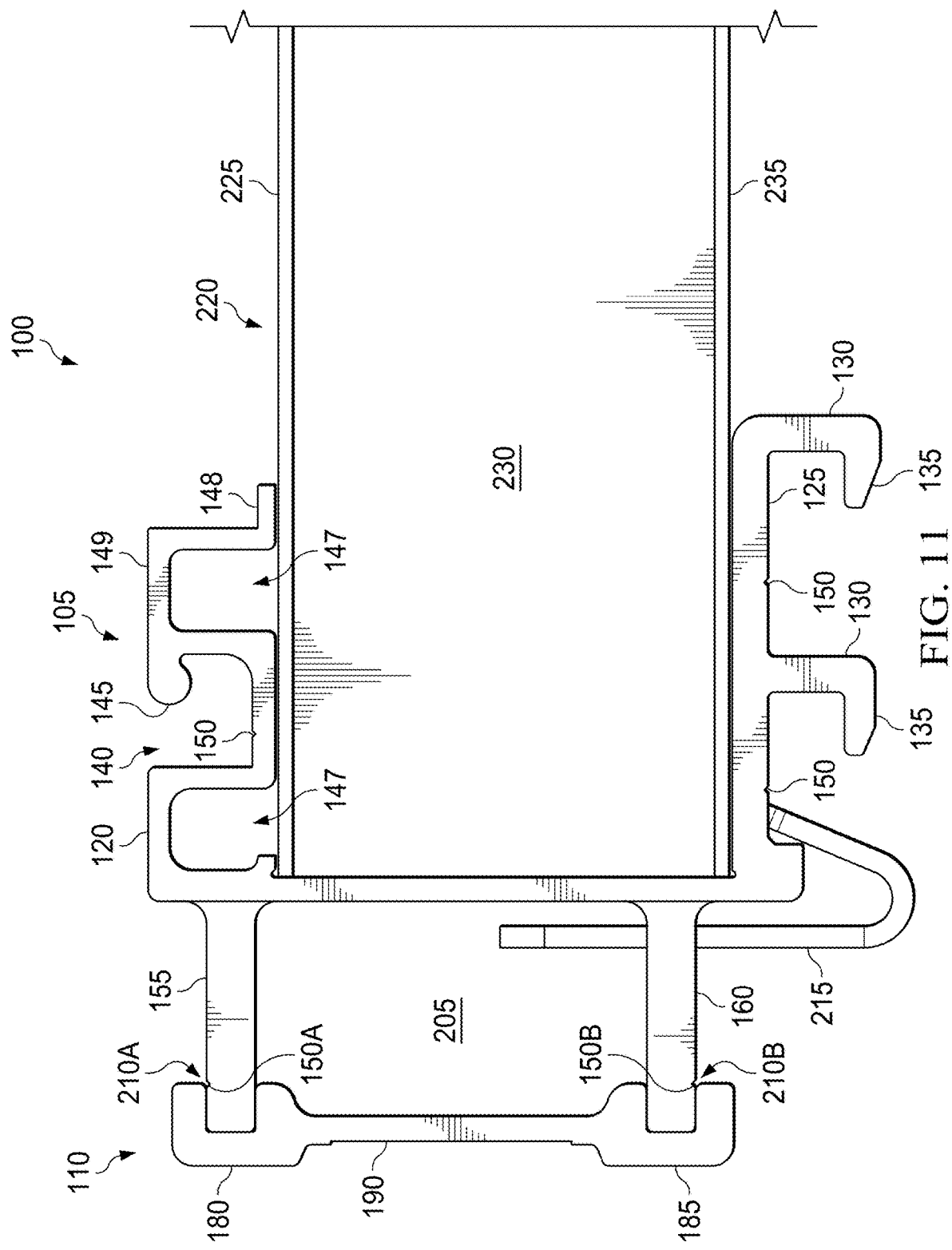
FIG. 11 illustrates an end view of the side rail of FIG. 10, together with the plurality of structural member of the trailer, according to one or more embodiments.

FIGS. 10 and 11 illustrate additional views of the side rail 100 in the assembled state or configuration, such that the side rail 100 is further attached to a plurality of structural members 220 (e.g., cross members) of a trailer, such as a flatbed trailer. In one or more embodiments, the plurality of structural members 220 extend between a pair of parallel-extending and spaced-apart side rail bodies 105 (only one side rail body 105 is shown) to provide additional structure to the side rail 100, and to provide a platform or foundation for trailer floorboards. In one or more embodiments, the structural members 220 are formed of an extruded metal, such as, for example, aluminum. In one or more embodiments, the structural members 220 are I-beams having an upper portion 225, a middle portion 230, and a lower portion 235.

As shown in FIG. 11, the structural members 220 extend into, and are received within, the C-channel shape of the side rail body 105 until an end of each structural member 220 abuts the side rail wall 115. In one or more embodiments, when in the assembled state or configuration, the upper portion 225 and the lower portion 235 of each structural member 220 abuts respective interior portions of the upper rail wall 120 and the lower rail wall 125. In one or more embodiments, the structural members 220 are attached to the side rail body 105 via welding. In one or more embodiments, the structural members 220 are attached to the side rail body 105 via fasteners, which fasteners may be received via the notches 150. One or more embodiments of the present application are provided in whole or in part as described in the Appendix of the '303 Application, which forms part of the present application. It is understood that one or more of the embodiments described above and shown FIGS. 1 through 11 may be combined in whole or in part with one or more of the embodiments described and illustrated in the Appendix of the '303 Application, and/or one or more of the other embodiments described above and shown in FIGS. 1 through 11. A side rail for a trailer has been disclosed according to one or more embodiments of the present disclosure. The side rail generally includes: a side rail body that is, or is at least adapted to be, operably coupled to the trailer, said side rail body including: an elongated side rail wall defining opposing upper and lower portions; an upper connecting wall extending transversely from the upper portion of the side rail wall; and a lower connecting wall spaced apart from the upper connecting wall and extending transversely from the lower portion of the side rail wall; and a rub rail body that is, or is at least adapted to be, operably coupled to the side rail body, said rub rail body including: an elongated rub rail wall defining opposing upper and lower portions; an upper groove disposed proximate the upper portion of the rub rail wall and adapted to receive a portion of the upper connecting wall of the side rail body when the rub rail body is operably coupled to the side rail body; and a lower groove spaced apart from the upper groove, disposed proximate the lower portion of the rub rail wall, and adapted to receive a portion of the lower connecting wall of the side rail body when the rub rail body is operably coupled to the side rail body. In one or more embodiments, when the rub rail body is operably coupled to the side rail body, a longitudinal passage is defined between, and extends along, the rub rail body and the side rail body, said longitudinal passage being at least partially bounded by the rub rail wall of the rub rail body, the side rail wall of the side rail body, the upper connecting wall of the side rail body, and the lower connecting wall of the side rail body. In one or more embodiments, the upper connecting wall of the side rail body is segmented along a longitudinal length of the side rail body proximate the upper portion of the side rail wall so that the segmented upper connecting wall is interspersed with, and spaced apart by, a plurality of upper gaps; and the lower connecting wall of the side rail body is segmented along the longitudinal length of the side rail body proximate the lower portion of the side rail wall so that the segmented lower connecting wall is interspersed with, and spaced apart by, a plurality of lower gaps. In one or more embodiments, each segment of the upper connecting wall of the side rail body corresponds to a respective segment of the lower connecting wall of the side rail body; and each segment of the upper connecting wall of the side rail body is longitudinally aligned with the corresponding segment of the lower connecting wall of the side rail body along the longitudinal length of the side rail body. In one or more embodiments, each gap of the plurality of upper gaps of the side rail body corresponds to a respective gap of the plurality of lower gaps of the side rail body; and each gap of the plurality of upper gaps of the side rail body is longitudinally aligned with the corresponding gap of the plurality of lower gaps of the side rail body along the longitudinal length of the side rail body. In one or more embodiments, the side rail body further includes: an upper rail wall extending transversely from the upper portion of the side rail wall in a direction opposite a direction in which the upper connecting wall and the lower connecting wall extend from the side rail wall; and a lower rail wall spaced apart from the upper rail wall and extending transversely from the lower portion of the side rail wall in the direction opposite the direction in which the upper connecting wall and the lower connecting wall extend from the side rail wall; and the side rail wall, the upper rail wall, and the lower rail wall of the side rail body together define a channel adapted to receive one or more structural members of the trailer when the side rail body is operably coupled to the trailer. In one or more embodiments, the lower rail wall of the side rail body includes a plurality of openings to facilitate attachment of load securing devices and/or assemblies; each opening of the plurality of openings of the lower rail wall of the side rail body corresponds to: a respective gap of the plurality of lower gaps of the side rail body; and a respective gap of the plurality of upper gaps of the side rail body; and ach opening of the plurality of openings of the lower rail wall of the side rail body is longitudinally aligned with: the corresponding gap of the plurality of lower gaps of the side rail body along the longitudinal length of the side rail body; and the corresponding gap of the plurality of upper gaps of the side rail body along the longitudinal length of the side rail body. In one or more embodiments, the side rail body is a one-piece extruded body; and the rub rail body is a one-piece extruded body. In one or more embodiments, the rub rail wall further defines a middle portion extending between the upper portion of the rub rail wall and the lower portion of the rub rail wall, said middle portion of the rub rail wall being thinner than the upper portion of the rub rail wall and the lower portion of the rub rail wall.

A side rail body that is, or is at least adapted to be, operably coupled to a trailer, has also been disclosed according to one or more embodiments of the present disclosure. The side rail body generally includes: an elongated side rail wall defining opposing upper and lower portions; an upper connecting wall extending transversely from the upper portion of the side rail wall, wherein a portion of the upper connecting wall of the side rail body is adapted to be received into an upper groove of a rub rail body when the rub rail body is operably coupled to the side rail body; and a lower connecting wall spaced apart from the upper connecting wall and extending transversely from the lower portion of the side rail wall, wherein a portion of the lower connecting wall of the side rail body is adapted to be received into a lower groove of the rub rail body when the rub rail body is operably coupled to the side rail body. In one or more embodiments, when the rub rail body is operably coupled to the side rail body, a longitudinal passage is defined between, and extends along, the rub rail body and the side rail body, said longitudinal passage being at least partially bounded by a rub rail wall of the rub rail body, the side rail wall of the side rail body, the upper connecting wall of the side rail body, and the lower connecting wall of the side rail body. In one or more embodiments, the upper connecting wall of the side rail body is segmented along a longitudinal length of the side rail body proximate the upper portion of the side rail wall so that the segmented upper connecting wall is interspersed with, and spaced apart by, a plurality of upper gaps; and the lower connecting wall of the side rail body is segmented along the longitudinal length of the side rail body proximate the lower portion of the side rail wall so that the segmented lower connecting wall is interspersed with, and spaced apart by, a plurality of lower gaps. In one or more embodiments, each segment of the upper connecting wall of the side rail body corresponds to a respective segment of the lower connecting wall of the side rail body; and each segment of the upper connecting wall of the side rail body is longitudinally aligned with the corresponding segment of the lower connecting wall of the side rail body along the longitudinal length of the side rail body. In one or more embodiments, each gap of the plurality of upper gaps of the side rail body corresponds to a respective gap of the plurality of lower gaps of the side rail body; and each gap of the plurality of upper gaps of the side rail body is longitudinally aligned with the corresponding gap of the plurality of lower gaps of the side rail body along the longitudinal length of the side rail body. In one or more embodiments, the side rail body further includes: an upper rail wall extending transversely from the upper portion of the side rail wall in a direction opposite a direction in which the upper connecting wall and the lower connecting wall extend from the side rail wall; and a lower rail wall spaced apart from the upper rail wall and extending transversely from the lower portion of the side rail wall in the direction opposite the direction in which the upper connecting wall and the lower connecting wall extend from the side rail wall; and the side rail wall, the upper rail wall, and the lower rail wall of the side rail body together define a channel adapted to receive one or more structural members of the trailer when the side rail body is operably coupled to the trailer. In one or more embodiments, the lower rail wall of the side rail body includes a plurality of openings to facilitate attachment of load securing devices and/or assemblies; each opening of the plurality of openings of the lower rail wall of the side rail body corresponds to: a respective gap of the plurality of lower gaps of the side rail body; and a respective gap of the plurality of upper gaps of the side rail body; and each opening of the plurality of openings of the lower rail wall of the side rail body is longitudinally aligned with: the corresponding gap of the plurality of lower gaps of the side rail body along the longitudinal length of the side rail body; and the corresponding gap of the plurality of upper gaps of the side rail body along the longitudinal length of the side rail body. In one or more embodiments, the side rail body is a one-piece extruded body.

A rub rail body that is, or is at least adapted to be, operably coupled to a trailer, has also been disclosed according to one or more embodiments of the present disclosure. The rub rail body generally includes: an elongated rub rail wall defining opposing upper and lower portions; an upper groove disposed proximate the upper portion of the rub rail wall and adapted to receive a portion of an upper connecting wall of a side rail body when the rub rail body is operably coupled to the side rail body, said side rail body being, or at least being adapted to be, operably coupled to the trailer; and a lower groove spaced apart from the upper groove, disposed proximate the lower portion of the rub rail wall, adapted to receive a portion of a lower connecting wall of the side rail body when the rub rail body is operably coupled to the side rail body. In one or more embodiments, when the rub rail body is operably coupled to the side rail body, a longitudinal passage is defined between, and extends along, the rub rail body and the side rail body, said longitudinal passage being at least partially bounded by the rub rail wall of the rub rail body, a side rail wall of the side rail body, the upper connecting wall of the side rail body, and the lower connecting wall of the side rail body. In one or more embodiments, the rub rail body is a one-piece extruded body. In one or more embodiments, the rub rail wall further defines a middle portion extending between the upper portion of the rub rail wall and the lower portion of the rub rail wall, said middle portion of the rub rail wall being thinner than the upper portion of the rub rail wall and the lower portion of the rub rail wall.

The present disclosure also introduces a method for connecting a rub rail body to a side rail body of a trailer. The method generally includes: receiving an upper connecting wall of the side rail body into an upper groove of the rub rail body, wherein the upper connecting wall extends transversely from an upper portion of a side rail wall of the side rail body, and wherein the upper groove is disposed proximate an upper portion of a rub rail wall of the rub rail body; and receiving a lower connecting wall of the side rail body into a lower groove of the rub rail body, wherein the lower connecting wall extends transversely from a lower portion of the side rail wall of the side rail body, and wherein the lower groove is disposed proximate a lower portion of the rub rail wall of the rub rail.

The present disclosure also introduces an apparatus for a trailer. The apparatus generally includes: a side rail body, including: an elongated side rail wall defining opposing upper and lower portions; an upper connecting wall extending transversely from the upper portion of the side rail wall; and a lower connecting wall extending transversely from the lower portion of the side rail wall; a rub rail body, including: an elongated rub rail wall defining opposing upper and lower portions; an upper groove disposed proximate the upper portion of the rub rail wall and adapted to receive the upper connecting wall of the side rail body; and a lower groove disposed proximate the lower portion of the rub rail wall and adapted to receive the lower connecting wall of the side rail body.

The present disclosure also introduces a rub rail body for a trailer. The rub rail body generally includes: an elongated rub rail wall defining opposing upper and lower portions; an upper groove disposed proximate the upper portion of the rub rail wall and adapted to receive an upper connecting wall of a side rail body of the trailer; and a lower groove disposed proximate the lower portion of the rub rail wall and adapted to receive a lower connecting wall of the side rail body of the trailer.

The present disclosure also introduces a side rail body for a trailer. The side rail body generally includes: an elongated side rail wall defining opposing upper and lower portions; an upper connecting wall extending transversely from the upper portion the side rail wall so as to define a distal end adapted to be received into an upper groove of a rub rail body; and a lower connecting wall extending transversely from the lower portion of the side rail wall so as to define another distal end adapted to be received into a lower groove of the rub rail body.

The present disclosure also introduces a side rail for a trailer, which side rail has been described according to one or more aspects of the present disclosure.

The present disclosure also introduces a side rail body for a trailer, which side rail body has been described according to one or more aspects of the present disclosure.

The present disclosure also introduces a rub rail body for a trailer, which rub rail body has been described according to one or more aspects of the present disclosure.

The present disclosure also introduces a connecting wall for a trailer, which connecting wall has been described according to one or more aspects of the present disclosure.

The present disclosure also introduces a structural member for a trailer, which structural member has been described according to one or more aspects of the present disclosure.

The present disclosure also introduces a load securing device for a trailer, which load securing device has been described according to one or more aspects of the present disclosure.

The present disclosure also introduces an apparatus, which apparatus has been described according to one or more aspects of the present disclosure.

The present disclosure also introduces a system, which system has been described according to one or more aspects of the present disclosure.

The present disclosure also introduces a method, which method has been described according to one or more aspects of the present disclosure.

The present disclosure also introduces an assembly, which assembly has been described according to one or more aspects of the present disclosure.

The present disclosure also introduces a kit, which kit has been described according to one or more aspects of the present disclosure.

It is further understood that variations may be made in the foregoing without departing from the scope of the disclosure.

In one or more embodiments, the elements and teachings of the various embodiments disclosed herein may be combined in whole or in part in some or all of said embodiment(s). In addition, one or more of the elements and teachings of the various embodiments disclosed herein may be omitted, at least in part, or combined, at least in part, with one or more of the other elements and teachings of said embodiment(s).

Any spatial references such as, for example, "upper," "lower," "above," "below," "between," "bottom," "vertical," "horizontal," "angular," "upwards," "downwards," "side-to-side," "left-to-right," "left," "right," "right-to-left," "top-to-bottom," "bottom-to-top," "top," "bottom," "bottom-up," "top-down," etc., are for the purpose of illustration only and do not limit the specific orientation or location of the structure described above.

In one or more embodiments, while different steps, processes, and procedures are described as appearing as distinct acts, one or more of the steps, one or more of the processes, or one or more of the procedures may also be performed in different orders, simultaneously or sequentially. In one or more embodiments, the steps, processes, or procedures may be merged into one or more steps, processes, or procedures. In one or more embodiments, one or more of the operational steps in each embodiment may be omitted. Moreover, in some instances, some features of the present disclosure may be employed without a corresponding use of the other features. Moreover, one or more of the embodiments disclosed above and in the Appendix of the '303 Application, or variations thereof, may be combined in whole or in part with any one or more of the other embodiments described above and in the Appendix of the '303 Application, or variations thereof.

Although various embodiments have been disclosed in detail above and in the Appendix of the '303 Application, the embodiments disclosed are exemplary only and are not limiting, and those skilled in the art will readily appreciate that many other modifications, changes, and substitutions are possible in the embodiments without materially departing from the novel teachings and advantages of the present disclosure. Accordingly, all such modifications, changes, and substitutions are intended to be included within the scope of this disclosure as defined in the following claims. In the claims, means-plus-function clauses are intended to cover the structures described herein as performing the recited function and not only structural equivalents, but also equivalent structures. Moreover, it is the express intention of the applicant not to invoke 35 U.S.C. § 112 (f) for any limitations of any of the claims herein, except for those in which the claim expressly uses the word "means" together with an associated function.

What is claimed is:

1. A side rail for a trailer, the side rail comprising:
    a side rail body that is, or is at least adapted to be, operably coupled to the trailer, said side rail body comprising:
        an elongated side rail wall defining opposing upper and lower portions;
        an upper connecting wall extending transversely from the upper portion of the side rail wall; and
        a lower connecting wall spaced apart from the upper connecting wall and extending transversely from the lower portion of the side rail wall;
    and
    a rub rail body that is, or is at least adapted to be, operably coupled to the side rail body, said rub rail body comprising:
        an elongated rub rail wall defining opposing upper and lower portions;
        an upper groove disposed proximate the upper portion of the rub rail wall and adapted to receive a portion of the upper connecting wall of the side rail body when the rub rail body is operably coupled to the side rail body; and
        a lower groove spaced apart from the upper groove, disposed proximate the lower portion of the rub rail wall, and adapted to receive a portion of the lower connecting wall of the side rail body when the rub rail body is operably coupled to the side rail body.

2. The side rail of claim 1, wherein, when the rub rail body is operably coupled to the side rail body, a longitudinal passage is defined between, and extends along, the rub rail body and the side rail body, said longitudinal passage being at least partially bounded by the rub rail wall of the rub rail body, the side rail wall of the side rail body, the upper connecting wall of the side rail body, and the lower connecting wall of the side rail body.

3. The side rail of claim 1, wherein the upper connecting wall of the side rail body is segmented along a longitudinal length of the side rail body proximate the upper portion of the side rail wall so that the segmented upper connecting wall is interspersed with, and spaced apart by, a plurality of upper gaps; and
    wherein the lower connecting wall of the side rail body is segmented along the longitudinal length of the side rail body proximate the lower portion of the side rail wall so that the segmented lower connecting wall is interspersed with, and spaced apart by, a plurality of lower gaps.

4. The side rail of claim 3,
    wherein each segment of the upper connecting wall of the side rail body corresponds to a respective segment of the lower connecting wall of the side rail body; and
    wherein each segment of the upper connecting wall of the side rail body is longitudinally aligned with the corresponding segment of the lower connecting wall of the side rail body along the longitudinal length of the side rail body.

5. The side rail of claim 3,
    wherein each gap of the plurality of upper gaps of the side rail body corresponds to a respective gap of the plurality of lower gaps of the side rail body; and
    wherein each gap of the plurality of upper gaps of the side rail body is longitudinally aligned with the corresponding gap of the plurality of lower gaps of the side rail body along the longitudinal length of the side rail body.

6. The side rail of claim 3,
    wherein the side rail body further comprises:
        an upper rail wall extending transversely from the upper portion of the side rail wall in a direction opposite a direction in which the upper connecting wall and the lower connecting wall extend from the side rail wall; and
        a lower rail wall spaced apart from the upper rail wall and extending transversely from the lower portion of the side rail wall in the direction opposite the direction in which the upper connecting wall and the lower connecting wall extend from the side rail wall; and wherein the side rail wall, the upper rail wall, and the lower rail wall of the side rail body together define a channel adapted to receive one or more structural members of the trailer when the side rail body is operably coupled to the trailer.

7. The side rail of claim 6,
wherein the lower rail wall of the side rail body includes a plurality of openings to facilitate attachment of load securing devices and/or assemblies;
wherein each opening of the plurality of openings of the lower rail wall of the side rail body corresponds to:
  a respective gap of the plurality of lower gaps of the side rail body; and
  a respective gap of the plurality of upper gaps of the side rail body;
and
wherein each opening of the plurality of openings of the lower rail wall of the side rail body is longitudinally aligned with:
  the corresponding gap of the plurality of lower gaps of the side rail body along the longitudinal length of the side rail body; and
  the corresponding gap of the plurality of upper gaps of the side rail body along the longitudinal length of the side rail body.

8. The side rail of claim 1,
wherein the side rail body is a one-piece extruded body; and
wherein the rub rail body is a one-piece extruded body.

9. The side rail of claim 1, wherein the rub rail wall further defines a middle portion extending between the upper portion of the rub rail wall and the lower portion of the rub rail wall, said middle portion of the rub rail wall being thinner than the upper portion of the rub rail wall and the lower portion of the rub rail wall.

10. A side rail body that is, or is at least adapted to be, operably coupled to a trailer, said side rail body comprising:
  an elongated side rail wall defining opposing upper and lower portions;
  an upper connecting wall extending transversely from the upper portion of the side rail wall,
    wherein a portion of the upper connecting wall of the side rail body is adapted to be received into an upper groove of a rub rail body when the rub rail body is operably coupled to the side rail body;
  and
  a lower connecting wall spaced apart from the upper connecting wall and extending transversely from the lower portion of the side rail wall,
    wherein a portion of the lower connecting wall of the side rail body is adapted to be received into a lower groove of the rub rail body when the rub rail body is operably coupled to the side rail body;
  wherein, when the rub rail body is operably coupled to the side rail body, a longitudinal passage is defined between, and extends along, the rub rail body and the side rail body, said longitudinal passage being at least partially bounded by a rub rail wall of the rub rail body, the side rail wall of the side rail body, the upper connecting wall of the side rail body, and the lower connecting wall of the side rail body.

11. A side rail body that is, or is at least adapted to be, operably coupled to a trailer, said side rail body comprising:
  an elongated side rail wall defining opposing upper and lower portions;
  an upper connecting wall extending transversely from the upper portion of the side rail wall,
    wherein a portion of the upper connecting wall of the side rail body is adapted to be received into an upper groove of a rub rail body when the rub rail body is operably coupled to the side rail body;
  and
  a lower connecting wall spaced apart from the upper connecting wall and extending transversely from the lower portion of the side rail wall,
    wherein a portion of the lower connecting wall of the side rail body is adapted to be received into a lower groove of the rub rail body when the rub rail body is operably coupled to the side rail body;
  wherein the upper connecting wall of the side rail body is segmented along a longitudinal length of the side rail body proximate the upper portion of the side rail wall so that the segmented upper connecting wall is interspersed with, and spaced apart by, a plurality of upper gaps; and
  wherein the lower connecting wall of the side rail body is segmented along the longitudinal length of the side rail body proximate the lower portion of the side rail wall so that the segmented lower connecting wall is interspersed with, and spaced apart by, a plurality of lower gaps.

12. The side rail body of claim 11,
wherein each segment of the upper connecting wall of the side rail body corresponds to a respective segment of the lower connecting wall of the side rail body; and
wherein each segment of the upper connecting wall of the side rail body is longitudinally aligned with the corresponding segment of the lower connecting wall of the side rail body along the longitudinal length of the side rail body.

13. The side rail body of claim 11,
wherein each gap of the plurality of upper gaps of the side rail body corresponds to a respective gap of the plurality of lower gaps of the side rail body; and
wherein each gap of the plurality of upper gaps of the side rail body is longitudinally aligned with the corresponding gap of the plurality of lower gaps of the side rail body along the longitudinal length of the side rail body.

14. The side rail body of claim 11,
wherein the side rail body further comprises:
  an upper rail wall extending transversely from the upper portion of the side rail wall in a direction opposite a direction in which the upper connecting wall and the lower connecting wall extend from the side rail wall; and
  a lower rail wall spaced apart from the upper rail wall and extending transversely from the lower portion of the side rail wall in the direction opposite the direction in which the upper connecting wall and the lower connecting wall extend from the side rail wall;
and
wherein the side rail wall, the upper rail wall, and the lower rail wall of the side rail body together define a channel adapted to receive one or more structural members of the trailer when the side rail body is operably coupled to the trailer.

15. The side rail body of claim 14,
wherein the lower rail wall of the side rail body includes
a plurality of openings to facilitate attachment of load securing devices and/or assemblies;
wherein each opening of the plurality of openings of the lower rail wall of the side rail body corresponds to:
a respective gap of the plurality of lower gaps of the side rail body; and
a respective gap of the plurality of upper gaps of the side rail body;
and
wherein each opening of the plurality of openings of the lower rail wall of the side rail body is longitudinally aligned with:
the corresponding gap of the plurality of lower gaps of the side rail body along the longitudinal length of the side rail body; and
the corresponding gap of the plurality of upper gaps of the side rail body along the longitudinal length of the side rail body.

16. The side rail body of claim 11, wherein the side rail body is a one-piece extruded body.

17. The side rail body of claim 10,
wherein the side rail body further comprises:
an upper rail wall extending transversely from the upper portion of the side rail wall in a direction opposite a direction in which the upper connecting wall and the lower connecting wall extend from the side rail wall; and
a lower rail wall spaced apart from the upper rail wall and extending transversely from the lower portion of the side rail wall in the direction opposite the direction in which the upper connecting wall and the lower connecting wall extend from the side rail wall;
and
wherein the side rail wall, the upper rail wall, and the lower rail wall of the side rail body together define a channel adapted to receive one or more structural members of the trailer when the side rail body is operably coupled to the trailer.

18. The side rail body of claim 17,
wherein the lower rail wall of the side rail body includes
a plurality of openings to facilitate attachment of load securing devices and/or assemblies;
wherein each opening of the plurality of openings of the lower rail wall of the side rail body corresponds to:
a respective gap of the plurality of lower gaps of the side rail body; and
a respective gap of the plurality of upper gaps of the side rail body;
and
wherein each opening of the plurality of openings of the lower rail wall of the side rail body is longitudinally aligned with:
the corresponding gap of the plurality of lower gaps of the side rail body along the longitudinal length of the side rail body; and
the corresponding gap of the plurality of upper gaps of the side rail body along the longitudinal length of the side rail body.

19. The side rail body of claim 10, wherein the side rail body is a one-piece extruded body.

* * * * *